Patented July 16, 1929.

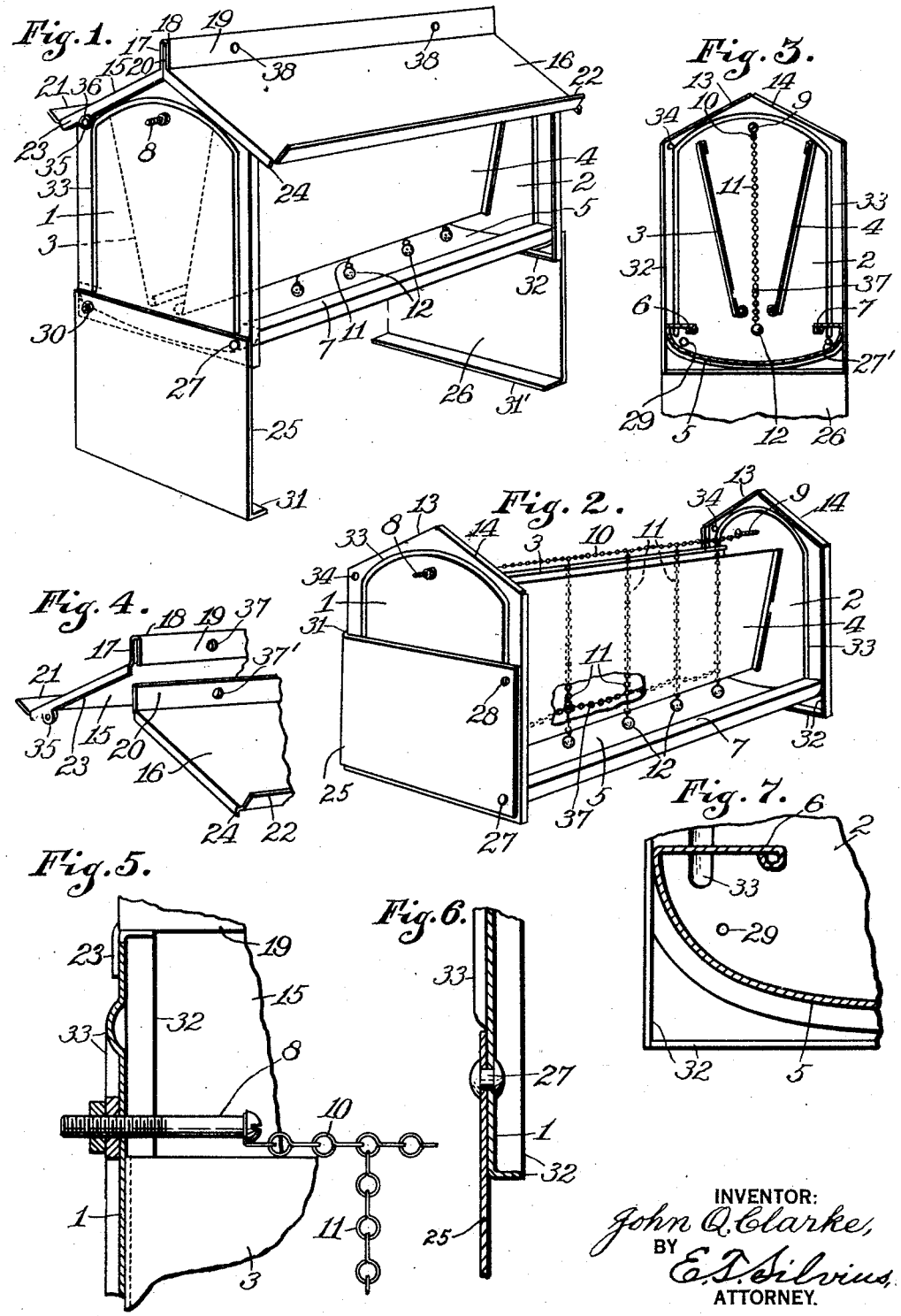

1,720,884

UNITED STATES PATENT OFFICE.

JOHN Q. CLARKE, OF CRAWFORDSVILLE, INDIANA.

AUTOMATIC FEEDER FOR FOWLS.

Application filed March 12, 1927. Serial No. 174,874.

This invention relates to a sanitary feeder for domestic fowls that is designed to supply clean and healthful food as needed by the fowls, the invention having reference more particularly to means whereby grain food may be automatically fed into a feed-trough through the action of the fowls or as a consequence of the fowls obtaining the food.

An object of the invention is to provide an improved feeding apparatus for fowls which shall be of such construction as to be adapted to constantly supply dry clean food in wholesome condition.

Another object is to provide a feeder for fowls that shall be of simple and efficient construction and not costly to manufacture.

A further object is to provide an improved automatic feeder which shall be adapted to be compactly shipped from the factory and to be readily set up for use by the purchaser, which shall be of light weight and yet substantial in structure, and which shall be durable and economical in use.

With the above-mentioned and other objects in view, the invention consists in a feeder construction having novel and useful features, particularly with reference to means whereby fowls when feeding may automatically cause the food to be intermittently fed into a receptacle to be taken by the fowls, the invention consisting further in the parts and combinations and arrangements of parts as hereinafter particularly described and further defined in the claims appended hereto.

Referring to the drawings,—Figure 1 is a perspective view of the improved feeder set up for use; Fig. 2 is a perspective view of the feeder minus its roof, the leg members of the feeder being folded up compactly for shipping purposes; Fig. 3 is a transverse vertical section of Fig. 2 with one of the leg members unfolded and partially broken away; Fig. 4 is a fragmentary perspective view of the improved roof as preferably constructed with parts arranged ready to be connected together; Fig. 5 is a fragmentary sectional detail of closely related parts on an enlarged scale; Fig. 6 is a fragmentary section of one of the leg members on an enlarged scale; and Fig. 7 is a fragmentary transverse section showing the feed-trough details on an enlarged scale.

Similar reference characters in the different figures of the drawings indicate corresponding elements or features of construction herein referred to in detail.

Practically the improved feeder comprises two opposite upright receptacle end members 1 and 2 and feed-hopper side plates 3 and 4 secured at their ends to the end members in inclined arrangement, the tops of the plates being spaced farther apart than their lower ends. The receptacle for the food comprises preferably a curved feed-trough 5 arranged below the feed-hopper and secured at its ends to the end members 1 and 2, the upper face of the feed-trough being concave and having inwardly extending flanges 6 and 7 on its upper edges respectively to prevent food from being dragged out over the top edges of the feed-trough.

Sanitary and efficient feeding devices are provided which comprise preferably a pair of oppositely arranged screws 8 and 9 secured in the upper middle portions of the members 1 and 2 respectively, a stringer chain 10 secured to the screws and tightened thereby, and a plurality of vibratory agitator chains 11 connected to the chain 10 in suitably spaced apart relation, the lower end of each vibratory chain having a bright object such as a ball 12 connected thereto so as to be accessible to feeding fowls, being in the feed-trough below the feed-hopper, so that the fowls may incidentally strike the objects with their bills while feeding or be induced to do so as a result of their inclination to peck at bright objects. The ball may be in the form of a button composed of glass or other substance or may be composed of bright metal.

For the purpose of providing an advantageous roof, the end members 1 and 2 have each a top portion 13 sloping in one direction and another portion 14 sloping in the opposite direction which directly support two roof plates 15 and 16, one plate having an upstanding ridge plate 17 with a cover portion 18 extending from its upper edge and an opposite clamp plate 19 extending downward to embrace a bridge plate 20 provided on the roof plate 16, the ridge structure being sufficiently high to prevent fowls from roosting thereon while affording means whereby the roof plates are locked together. One roof plate has a gutter member 21 on its lower portion and the other roof plate has a gutter member 22 thereon that protect the feed-trough from rain water. The roof may be lifted from place to permit refilling of the feed-hopper. Each of the opposite ends of one of the roof plates preferably has a downward extending flange 23 and the other has similar flanges 24 to engage the outer sides of the end members 1 and 2.

The end members of the feed-hopper are provided with leg members comprising plates 25 and 26 respectively that are pivotally connected adjacent to one upper corner by means of pivots 27 and 27' to the end members adjacent to a lower corner thereof. The opposite upper corner portion of each leg plate has a bolt hole 28 therein and each end member 1 and 2 has a corresponding bolt hole 29 to receive a bolt 30 whereby the leg plate is secured in place after the feeder has been received from the factory. The leg plates have inwardly extending base flanges 31 and 31' respectively on their bottom portions.

For permitting manufacture advantageously of light weight galvanized iron plates all edge portions of each member 1 and 2 are turned over each towards the other to provide stiffening members 32 therefor, and the end members preferably have stiffening ribs 33 pressed up in proximity to the edges of the members. Each end member 1 and 2 preferably has a bolt hole 34 adjacent to the lower end of one of the sloping tops, the roof plate flanges 23 have each a hinge ear 35, and pivot bolts 36 are applied in the holes to constitute hinges permitting the roof to be swung over from place so that the feed-hopper may be refilled.

For the purpose of assuring efficient feeding a horizontally arranged agitator chain 37 is connected to all the swinging agitator chains 11 at a suitable distance above the level of the bottom portions of the feed-hopper plates 3 and 4, to aid in loosening the grain food which may become more or less packed in the lower portion of the feed-hopper.

In practical use, having set up the feeder and filled the feed-hopper with dry food, the food gravitates into the feed-trough in sufficient quantity to supply the fowls, and when the supply is diminished or exhausted the fowls in their efforts to obtain more food instinctively peck at the bright objects 12 and cause the chains to vibrate and loosen the food which falls into the feed-trough, such action occurring also when the supply in the feed-trough is not entirely exhausted and the fowls incidentally strike the balls or the hanging chains with their bills.

What is claimed is:

1. A feeder for fowls including a feed-hopper, a feed-trough arranged below the feed-hopper, a vibratory stringer horizontally arranged in the upper portion of the feed-hopper and secured to the opposite ends thereof, and a plurality of flexible vibratory, agitator chains loosely connected to the stringer and accessible in the feed-trough to be separately or collectively vibrated.

2. A feeder for fowls including a feed-hopper, a feed-trough, arranged below the feed-hopper, a stringer chain horizontally secured to the upper portions of the opposite ends of the feed-hopper, and a plurality of flexible vibratory agitators separately connected to the chain, each agitator extending freely downward through the lower portion of the feed-hopper to be accessible in the feed trough and having a brightly-appearing object loosely connected to its end.

3. A feeder for fowls including a feed-hopper, a feed-trough, a taut stringer secured to the opposite ends of the feed-hopper, a plurality of separate flexible vibratory agitator chains connected to the stringer and loosely extending downward beyond the bottom of the feed-hopper, a plurality of bright-appearing devices loosely connected to the ends of the chains respectively, and a horizontally arranged flexible vibratory chain in the lower portion of the feed-hopper adjacent to said devices and connected to all the agitator chains.

In testimony whereof, I affix my signature on the 10th day of March, 1927.

JOHN Q. CLARKE.